Dec. 30, 1924.

B. G. GOBLE

ARTIFICIAL BAIT

Filed May 15, 1922

1,521,090

2 Sheets-Sheet 1

Inventor
B. G. Goble

By F. K. Bryant
Attorney

Dec. 30, 1924.

B. G. GOBLE

ARTIFICIAL BAIT

Filed May 15, 1922

1,521,090

2 Sheets-Sheet 2

Inventor
B. G. Goble

By F. K. Bryant,
Attorney

Patented Dec. 30, 1924.

1,521,090

UNITED STATES PATENT OFFICE.

BERT G. GOBLE, OF TULSA, OKLAHOMA.

ARTIFICIAL BAIT.

Application filed May 15, 1922. Serial No. 561,203.

*To all whom it may concern:*

Be it known that I, BERT G. GOBLE, a citizen of the United States of America, residing at Tulsa, in the county of Tulsa and State of Oklahoma, have invented certain new and useful Improvements in Artificial Baits, of which the following is a specification.

My invention relates to artificial bait of the kind used in fishing, my more particular purpose being to provide a construction of bait having generally the form of a fish or similar animal, and provided with means controllable by the motion of the bait through the water or the current of the water for causing the bait to simulate a natural swimming motion.

More particularly stated, my invention embodies a structure made in imitation of a small fish or the like, and having more or less flexibility, the structure being further provided with mechanism actuated when immersed in a current of water or drawn through it, for causing the bait to bend back and forth or flex with a rhythmic movement, simulating the motion of a fish swimming through the water.

The invention further comprehends fin members operatively associated with said mechanism and projectable by the latter so that the tips of the fins describe an orbital path in a vertical plane, whereby the bait more nearly simulates the natural motions of a swimming fish.

Another object is to generally simplify and improve the construction and actuating mechanism of artificial bait of the above kind whereby the invention will meet with all of the requirements for a successful commercial use.

With the above general objects in view and others that will appear as the nature of the invention is better understood, the same consists of the novel form, combination and arrangement of parts hereinafter more fully described, shown in the accompanying drawings and claimed.

Figure 1:
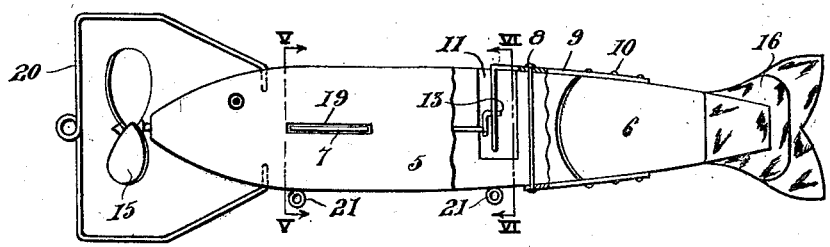
Figure 2:
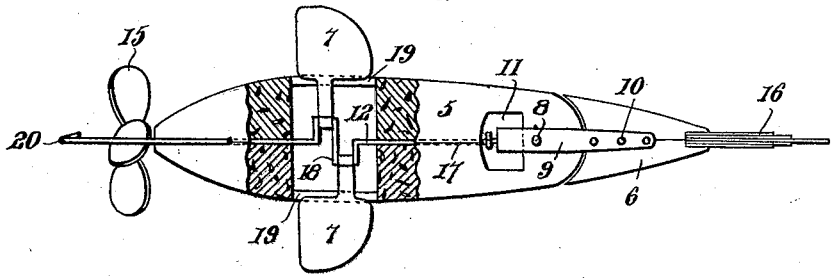
Figure 3:
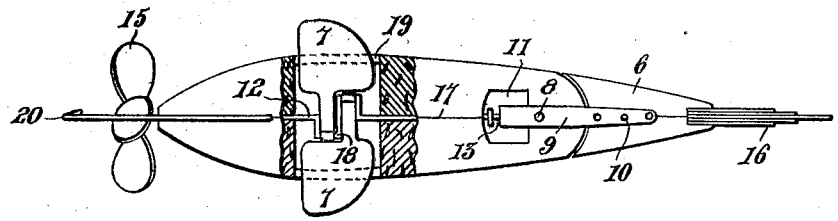
Figure 4:
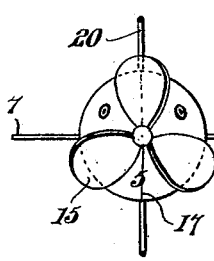
Figure 5:
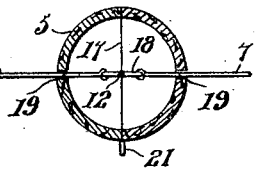
Figure 6:
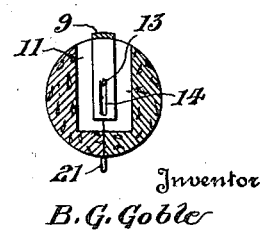
Figure 7:
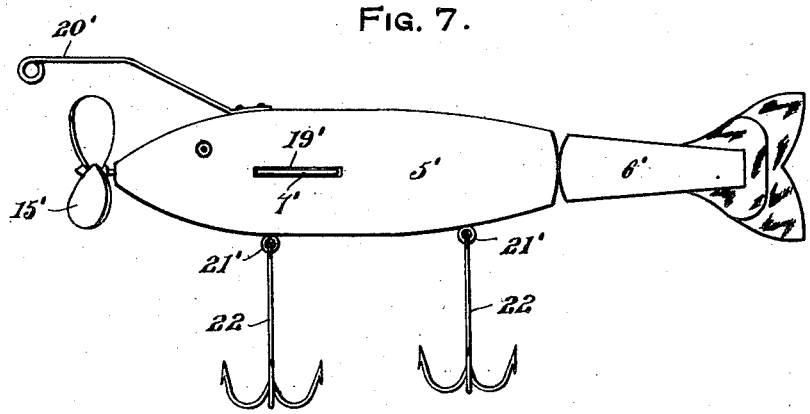
Figure 8:
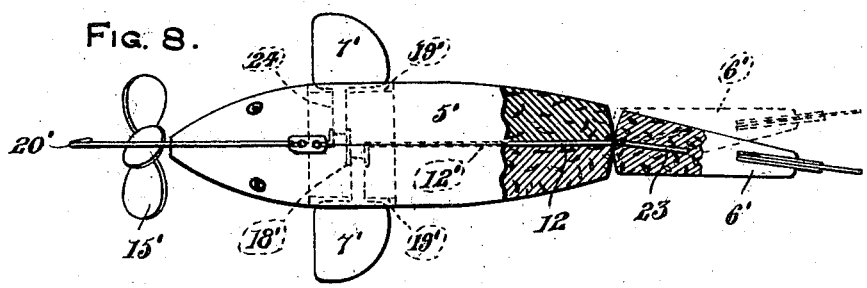
Figure 9:
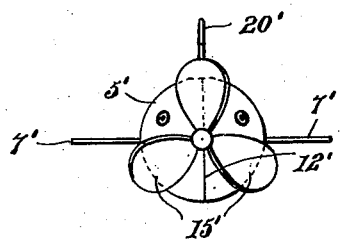
Figure 11:
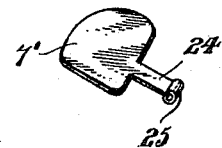
Figure 10:
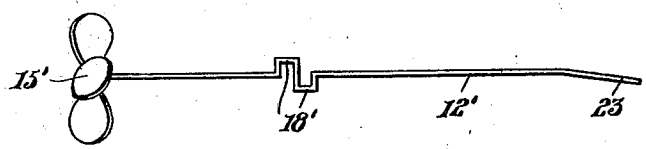

In the drawings, wherein like reference characters indicate corresponding parts throughout the several views, Figure 1 is a side elevational view, partly broken away to reveal details of the actuating mechanism, of a bait constructed in accordance with the present invention, Figure 2 is a top plan view, partly broken away and in section, of the device shown in Fig. 1, with the fins in projected position, Figure 3 is a view similar to Fig. 2 with the fins in retracted position, Figure 4 is a front elevational view of the device as shown in Fig. 2, Figure 5 is a transverse sectional view on line V—V of Fig. 1, Figure 6 is a view similar to Fig. 5 taken on line VI—VI of Fig. 1, Figure 7 is a side elevational view embodying a modification of the invention, Figure 8 is a view partly in top plan and partly in longitudinal section of the device shown in Fig. 7, the movable rear section of the bait being denoted by dotted lines as positioned when moved one quarter turn from the full line position of this figure, Figure 9 is a view similar to Fig. 4 of the device shown in Fig. 7, Figure 10 is a side elevational view of the crank shaft and screw propeller driving wheel of the device shown in Fig. 7, and Figure 11 is a perspective view of one of the fins.

Referring more in detail to the several views and particularly to the form of the invention illustrated in Figs. 1 to 6 inclusive, the invention embodies an artificial bait member having the general form of a fish and including a main body portion 5 with articulated members 6 and 7, the member 6 being preferably sufficiently large to include the tail portion and a small portion of the body proper of the fish. The members 5 and 6 may be made of wood, cork or other material not too heavy for the purpose, and are pivotally connected as at 8 by means of a pivot pin which is fixed in the rear end of the body member 5 in a vertical position and acts as a pintle upon which a pair of rigid strips 9 swing, the rear ends of the strips 9 being rigidly fastened by means of pins 10 or the like respectively through the upper and lower surfaces of the articulated member 6. The mating faces of the members 5 and 6 are preferably formed arcuate concentric with the pivot 8 as shown, and the body member 5 is provided with a vertical socket 11 which opens at the upper surface of said bottom member 5 and is situated adjacent to but forwardly of the pivot 8.

A power shaft 12 is journaled in and arranged axially of the bottom member 5 and terminates at its rear end in the socket 11 where it is provided with a crank 13, the upper strip 9 being extended forwardly of the pivot 8 and then downwardly into the socket 11 where it is provided with a vertical elongated slot 14 in which the crank pin 13 losely projects. The shaft 12 projects slightly beyond the head of the bait and has a screw propeller driving wheel 15 fastened thereon. As shown, the tail member 16 may be composed of a plurality of sheets of flexible material which gradually decrease in length from the center sheet to the outermost sheets and which may be secured, by gluing or the like, in the adjacent end of the articulated member 6.

With the construction thus far described the members 5 and 6 may be turned from separate blocks of wood so that each of said members can be of one piece construction. However, I prefer to employ the articulated members 7 also and when the latter are used the device may be readily constructed and assembled by forming the body member 5 in two longitudinal half sections joined as indicated at 17 by gluing or otherwise. The shaft 12 is provided with a pair of adjacent oppositely directed crank members 18 forwardly of the socket 11 and the body member 5 is made hollow at this point to provide clearance for said crank members to which the inner ends of the articulated members 7 are pivoted. The members 7 are located directly rearwardly of the head portion of the base and arranged to slide through side slots 19 provided in the body member 5, which slots are sufficiently wide to permit vertical tilting of the members 7 as well as sliding movement of the latter. It will be seen that, as the inner ends of the members 7 are pivotally attached to the crank members 18 and have pivotal bearings upon the walls of the slots 19, the tips of said members 7 will be caused to describe an orbital path upon rotation of shaft 12 with the path lying vertical and transversely of the bait. Such movement is greatly similar to fin movements of fish and the members 7 have the general form of fish fins of proper size.

A bail 20 or the like may be attached to the forward end of the bait so that the line may be readily attached, and eyes 21 may be provided on the underside of the body member 5 for convenient attachment of hooks.

In the form of the invention shown in Figs. 7 to 11 inclusive, the bait embodies a body member 5′ with articulated members 6′ and 7′ while hooks 22 are suspended from eyes 21′ carried by the body member 5′, the articulated members 7′ being in the form of fins operated in a manner similar to the member 7 from the axial crank shaft 12′ which is journaled longitudinally in the body member 5′. These members 7′ tilt vertically and slide in the side slots 19′ of the body member 5′ and are pivotally attached at their inner ends to the oppositely directed crank members 18′ of the shaft 12′ which is provided with a fixed screw propeller driving wheel 15′ upon its forward end.

A forwardly and upwardly extending member 20′ may be attached to the forward portion of the body member 5′ in lieu of the bail 20 for attachment of the fishing line.

Thus far described, the construction of this form of the invention is substantially the same as that shown in Figs. 1 to 6, but the adjacent ends of the members 5′ and 6′ are preferably of convex form to provide a rolling contact between the same and the only connection between said members consists in the rear end portion 23 of the shaft 12′ which is directed at an angle to the main portion of said shaft, and which is suitably fixed in and axially of the adjacent end of the member 6′.

As shown in Fig. 11, the fins are preferably constructed of sheet metal of the desired curvature or shape with respect to the portions which are projected beyond the outer face of the body member, while the inner ends are greatly reduced in width as at 24 so that transverse alinement of the fins may be obtained without interference, the reduced portions being return bent at their inner free ends as at 25 to form a bearing engaging the crank members.

In both forms the water wheel will operate to revolve the power shaft when immersed in a current of water or drawn through it, and through the connections described, the tips of the members 7, 7′ or 6′ will describe an orbital path lying vertical and transversely of the bait.

In both forms of the invention the number of necessary parts is reduced to a minimum and these parts are of such simple and durable form that the provision of a comparatively inexpensive bait capable of continued use without getting out of order, is insured, while the likelihood of binding or excessive friction between relatively movable parts is avoided.

While the crank members for the fins have been described as oppositely projecting for securing simultaneous retraction and projection of the two fins of each bait, it is obvious that said crank members may both be extended in the same direction so that a fin at one side will be retracted while the fin at the other side is being projected, without departing from the spirit of the invention.

The movement of the various articulated members will take place with a rhythmic motion, simulating that of a fish swimming as will be readily apparent by those skilled in the art from the foregoing description.

Minor changes may be made in the invention without departing from the spirit and scope of the invention as claimed.

What is claimed as new is:—

1. In an artificial bait, the combination with a body portion provided with a pivotally mounted tail-like member with its pivot being vertical and located forwardly of the rear end of said body portion, of a crank shaft journaled in said body portion with its rear end terminating in a crank located forwardly of said pivot, a part of said pivotal connection being engaged by said crank for causing horizontal swinging movement of the last named member upon rotation of said crank shaft.

2. In an artificial bait, the combination with a body portion provided with a tail-like articulated member with a vertical pivot located forwardly of the rear end of said body portion, of a crank shaft journaled in said body portion with its rear end terminating in a crank located forwardly of said pivot, means fixed to the tail-like member engaged by said crank for causing horizontal swinging movement of the last named member upon rotation of said crank shaft, said body portion having a vertical socket in which the crank is positioned, and said last named means embodying a strap constituting a part of the pivotal connection between the body portion and tail-like member fixed to the tail-like member, engaging the pivot of the latter and extending downwardly into said socket, the portion extending into said socket having a vertical elongated slot in which the crank loosely projects.

3. In an artificial bait, the combination with a body portion provided with a tail-like articulated member with a vertical pivot located forwardly of the rear end of said body portion, of a crank shaft journaled in said body portion with its rear end terminating in a crank located forwardly of said pivot, means fixed to the tail-like member engaged by said crank for causing horizontal swinging movement of the last named member upon rotation of said crank shaft, and a water wheel secured on the crank shaft and operating to revolve it when immersed in a current of water or drawn through it, said last named means further constituting means for pivotally connecting the tail-like member to the body member.

In testimony whereof I affix my signature.

BERT G. GOBLE.